3,218,726
METHOD OF MAKING FINELY DIVIDED SILICON DIOXIDE
David Muir, 412 Danforth Ave., Toronto, Ontario, Canada
No Drawing. Filed July 10, 1962, Ser. No. 208,944
2 Claims. (Cl. 34—5)

The present invention broadly relates to a method of providing extremely fine sized filler material and more specifically to a novel method of extracting the water from aqueous sols containing suspended particles of silicon dioxide of colloidal dimensions without effecting agglomeration thereof.

Finely particulated silicon dioxide powder exhibits excellent characteristics making it ideally suitable for use as a reinforcing or pigmenting filler material in a wide variety of natural and synthetic resinous formulations as well as in compounding various lubricant formulations. The exceptional properties of finely particulated silicon dioxide are particularly pronounced when the particles are of a size corresponding to colloidal dimensions. The extensive use of silicon dioxide powder has, however, been limited due to the difficulty of producing silicon dioxide in a finely particulated form having a size range preferably within colloidal dimensions by any of the methods heretofore known. The methods heretofore used or proposed for use have been subject to one or more inherent disadvantages requiring either complex and expensive equipment which is difficult to control or necessitate the consumption of large quantities of secondary materials which are discarded in the process substantially detracting from the economy of silicon dioxide filler materials produced thereby.

It is accordingly a principal object of the present invention to provide a novel method whereby silicon dioxide powder having particles of a size within the colloidal range can be simply and economically produced in commercial quantities.

Another object of the present invention is to provide an improved method whereby the water content of sols containing varying proportions of suspended silicon dioxide particles therein can be quickly and economically extracted without effecting an agglomeration of the individual extremely fine sized particles.

Still another object of the present invention is to provide an improved method of forming a relatively pure and extremely fine sized silicon dioxide powder which is eminently satisfactory for use as a reinforcing or pigmenting filler in various natural and synthetic resinous formulations, in the compounding of lubricants and greases, and the like.

A further object of the present invention is to provide an improved method of providing a silicon dioxide powder having the particles thereof within a colloidal size range and which process is of simple, versatile, flexible and economical control and operation.

The foregoing and other objects and advantages of the present invention are achieved by providing a sol broadly containing from about 1% up to about 30% by weight of relatively pure colloidal size silicon dioxide particles and rapidly freezing the sol entrapping the particles in a matrix of ice so as to prevent agglomeration of the individual particles followed thereafter by extraction or evaporation of the ice, preferably under vacuum conditions providing a residuary silicon dioxide powder the particle size of which corresponds substantially to the particle size and colloidal dimensions of the particles in the sol.

In accordance with the practice of the improved method comprising the present invention, a sol or colloidal suspension or dispersion of silicon dioxide is prepared in accordance with any one of a number of techniques now known to those skilled in the art. The specific concentration and purity of the silica sol will vary depending on the particular method employed for preparing the sol. The silicon dioxide present in the silica sol is in the form of polymolecular particles suspended in water and are of colloidal dimensions which are generally defined as a size ranging from about 10 to about 1000 Angstrom units or from about 0.001 to about 0.1 micron. By virtue of the method comprising the present invention, the individual suspended colloidal silicon dioxide particles can be extracted from the sol without effecting agglomeration or crystallization thereof into larger particles having a size above the aforementioned colloidal range in which they are unsuitable or undesirable for use as filler materials or as additives to lubricants, for example.

Included among the techniques for forming silica sols are dialysis; electrodialysis; the dissolution of elemental silicon in an aqueous solution of ammonia or an amine; the acidification or neutralization with acids of an aqueous solution of sodium silicate; the peptizing of silica gels at an elevated temperature in the presence of a small amount of alkali and under pressure; the use of ion-exchange resins for the removal of sodium and the purification of a solution of sodium silicate to yield a silicon dioxide sol; and the like. The specific concentration of the silicon dioxide expressed in terms of percent by weight of the silica sol will vary depending on the particular method employed for forming the sol. Sols prepared by some methods are less stable than those prepared by other methods necessitating a corresponding lower concentration in order to avoid gelation of the sol. The particular average particle size and the distribution of the size of the particles within the range of colloidal dimensions will also vary depending upon the particular method employed for forming the sol.

Conventionally, depending upon the particular technique used, stable silica sols can be prepared ranging in concentration of from about 1% up to about 30% by weight calculated as silicon dioxide. The stability of these sols or the tendency thereof to gel is effected by both the particle size and the concentration and is a function of the total surface area of the silica particles present in any unitary or given volume of liquid. Regardless of the particular technique employed for preparing the sol, the method should be controlled so as to provide a substantially stable sol having relatively pure silica particles therein within the colloidal range or less than about .1 micron which upon subsequent extraction of the water, as will be subsequently described, produce an extremely fine sized particulated silicon dioxide powder having exceptional filler characteristics.

In accordance with a preferred method of forming a silica sol by the method comprising the present invention, an aqueous solution is prepared of an ionizable salt of silicon such as sodium meta-silicate or sodium ortho-silicate providing a concentration of the silicate calculated on a weight equivalent basis of silicon dioxide ranging from about 1% up to about 5% and preferably from about 2% to about 4%. The resultant solution is thereafter subjected to electrodialysis whereby the sodium ions are removed through a permeable membrane as accelerated by a cathode disposed therebehind and the cathodic compartment is continuously washed with clear water to remove the accumulation of sodium ions formed at the cathode. As the sodium ions are progressively removed as an impurity from the solution, a corresponding progressive decrease in the pH of the solution occurs. It is usually preferred to stop the electrodialysis of the solution when the pH thereof approaches about 7.0 and more usually in a pH range of from about 6.8 to about 7.3.

The flow of current between the anodic compartment in which the solution is contained and the cathodic compartment containing fresh water to which the sodium ions and other positive ions migrate through the permeable membrane can be varied so as to provide the optimum characteristics for a given anode and cathode configuration as well as the permeability characteristics of the intervening membrane. Conventionally, amperages of a magnitude ranging from about 50 to 60 amperes per square foot of the cathode have provided satisfactorily rapid purification of the solution and the formation of a silica sol in which the particles are of the requisite colloidal dimensions and purity.

After the silica sol has been formed either by the electrodialysis technique previously described or by either one of the afore-mentioned techniques, it is necessary to extract the water therefrom in a manner so as to avoid the formation of strong silica-to-silica bonds between the individual colloidal particles effecting an agglomeration thereof into larger particles which are unsuitable or undesirable in silica powders for use as fillers or pigments in compounding resinous formulations or lubricants. In accordance with the discovery comprising the present invention, it has been found that by freezing the sol whereupon the water is converted to the solid state in a manner so as to avoid localized thawing and refreezing serves to stabilize or fix the sol enabling extraction of the water while in a solid state under vacuum conditions resulting in a finely particulated dry powder with no appreciable growth in the size of the individual colloid particles. The stability of the frozen silica sols is quite high and the sols in such frozen state may be stored substantially indefinitely without appreciably affecting agglomeration of the particles therein. It is important, however, that localized thawing of the sol be avoided since it is found that such melting followed by subsequent freezing of the sol is conducive to the agglomeration of the colloidal silicon dioxide particles in those molten portions of the sol detracting from the fineness in the particle size of the resultant dry silicon dioxide powder.

To avoid such localized thawing of the sol during the freezing operation, it is usually preferred to employ rapid freezing techniques whereby the rate of heat removal is high avoiding the presence of any localized "hot spots" from the solution. Any one of a number of refrigerant methods can be satisfactorily employed for effecting such a rapid freezing of the silica sol including Dry Ice in a solvent such as acetone, for example, liquid nitrogen, as well as conventional mechanical refrigeration techniques.

To facilitate rapid freezing and solidification of the silica sol, it is usually preferred to freeze the sol in relatively flat sheets or configurations predominantly comprising thin sections which also facilitates the subsequent extraction of water from the frozen sol. This can be suitably achieved in metal trays or pans of a relatively shallow depth or on a continuously moving belt-type conveyor, for example, having a high coefficient of conductivity which may alternatively be internally cooled or may be disposed with its underside in contact with a refrigerant. Sheets or thin sections of the frozen silica sol of a depth less than about 1 inch and preferably less than ½ inch thick have been found to freeze rapidly when subjected to refrigerants such as liquid nitrogen, for example, while concurrently providing a large surface area per unit volume facilitating the subsequent extraction of water therefrom. The sol can also be frozen in larger blocks, if desired, followed thereafter by crushing so as to increase the surface area of the frozen sol.

It will be apparent that the economics of the freezing phase of the method comprising the present invention is proportional to the concentration of the silicon dioxide present in the silica sol. Accordingly, the concentration of the silicon dioxide in the silica sol is maximized for the particular technique employed for forming the sol increasing the yield of dry silicon dioxide powder per unit weight of sol treated subject to such considerations as the fineness in particle size and the purity of the resultant powder in accordance with its intended end use.

The extraction of water from the frozen silica sol can be accomplished by any one of a number of chemical drying techniques and preferably is achieved by placing the frozen sol in a confined chamber to which a vacuum is applied and the water vapor is removed and recondensed on a refrigerated condenser leaving a residuary silicon dioxide powder substantially devoid of residual moisture. Since the vapor pressure of ice decreases from a magnitude of about 4.579 millimeters of mercury at 0° C. to a vapor pressure of only about 0.000012 millimeter mercury at −99° C., it is usually preferred during the vacuum removal or extraction of the water to maintain the frozen silica sol at a temperature as near to 0° C. while simultaneously assuring that no localized thawing of the frozen sol takes place.

As a typical example, a silica sol was prepared by electrodialysis from a solution containing 2% of sodium meta-silicate which was subjected to electrodialysis until the pH of the solution decreased to about 7.0. A glass flask was thereafter chilled in a bath containing acetone and Dry Ice into which a portion of the silica sol was poured in a manner so as to form a thin frozen film along the interior walls of the flask. The flask thereafter was connected to a distillation system under a vacuum of about 0.1 millimeter of mercury and the frozen sol was maintained at a temperature of about −40° C. The distillation system was provided with a condenser which was maintained at a low temperature by a Dry Ice-acetone refrigerant mixture on the surfaces of which the vapor removed from the frozen sol precipitated and froze. The vacuum extraction of the frozen water from the silica sol continued until only about 1% by weight of residual moisture remained. The vacuum was thereafter removed and the residuary substantially dry silicon dioxide was examined and found to be in the form of a fluffy substantially white powder having a particle size within the colloidal range which was extremely unctuous to the touch and exceptionally satisfactory as a filler and reinforcing or pigmenting agent for natural and synthetic resins compositions as well as an additive to lubricants such as greases, for example.

It has been found that in accordance with the method hereinbefore described, satisfactory silicon dioxide powders are produced when about 95% of the water therein has been extracted and preferably when the residuary water content of the silicon dioxide powder is less than about 2% and preferably less than about 1% by weight. As hereinbefore set forth, the water content of the frozen sol can be removed by vacuum distillation alone or in combination with one or more chemical drying techniques so as to produce a powder having residuary moisture content of less than the magnitude hereinabove set forth.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. The method of forming a finely particulated silicon dioxide powder, comprising the steps of providing an aqueous silica sol containing from about 1% up to about 30% by weight of silicon dioxide particles dispersed therein of a size less than about 0.1 microns, freezing said sol rapidly so as to avoid localized thawing and refreezing and entrapping said particles within a solid matrix of ice, subjecting the frozen said sol to subatmospheric pressure in a confined vessel, and thereafter extracting said ice by sublimation from the solid state to the vapor phase from the frozen said sol while maintaining said sol in the frozen state without any localized thawing for a period of time sufficient to remove substantially all of the water therefrom and forming a free flowing silicon dioxide powder.

2. The method of forming a finely particulated silicon dioxide powder, comprising the steps of providing an aqueous silica sol containing from about 1% up to about 30% by weight of silicon dioxide particles dispersed therein of a size less than about 0.1 microns, freezing said sol rapidly so as to avoid localized thawing and refreezing and entrapping said particles within a solid matrix of ice, subjecting the frozen said sol to subatmospheric pressure in a confined vessel, and thereafter extracting said ice by sublimation from the solid to the vapor phase from the frozen said sol while maintaining said sol in the frozen state without any localized thawing forming a silicon dioxide powder containing less than about 5% residuary water.

References Cited by the Examiner
UNITED STATES PATENTS

| | | | |
|---|---|---|---|
| 2,433,193 | 12/1947 | Bechtner | 34—5 XR |
| 2,515,098 | 7/1950 | Smith | 34—5 |
| 2,561,304 | 7/1951 | Hazel | 23—182 |
| 2,885,788 | 5/1959 | Leviton | 34—5 |

BENJAMIN HENKIN, *Primary Examiner.*

MAURICE A. BRINDISI, *Examiner.*